United States Patent
Aoki

(10) Patent No.: US 9,528,649 B2
(45) Date of Patent: Dec. 27, 2016

(54) FEMALE JOINT HAVING SAFETY FUNCTION

(71) Applicant: NITTO KOHKI CO., LTD., Tokyo (JP)

(72) Inventor: Kazunori Aoki, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 0 days.

(21) Appl. No.: 14/669,443

(22) Filed: Mar. 26, 2015

(65) Prior Publication Data

US 2015/0267851 A1 Sep. 24, 2015

Related U.S. Application Data

(63) Continuation of application No. PCT/JP2013/075987, filed on Sep. 26, 2013.

(30) Foreign Application Priority Data

Sep. 28, 2012 (JP) ................................ 2012-216399

(51) Int. Cl.
*F16L 37/46* (2006.01)
*F16L 37/44* (2006.01)
(Continued)

(52) U.S. Cl.
CPC .............. *F16L 37/44* (2013.01); *F16L 37/46* (2013.01); *F16K 3/0209* (2013.01); *F16L 37/23* (2013.01); *Y10S 285/924* (2013.01)

(58) Field of Classification Search
CPC ............ F16L 37/46; F16L 37/44; F16L 37/38; F16L 37/47; F16L 37/23; F16L 37/0841; F16L 37/367; F16L 37/36; Y10S 285/924; F16K 3/00; F16K 3/02; F16K 3/0209
(Continued)

(56) References Cited

U.S. PATENT DOCUMENTS 2,779,608 A * 1/1957 Abbey .................... F16L 37/26
251/149.1
3,423,063 A * 1/1969 German ................ F16L 29/007
251/149.6
(Continued)

FOREIGN PATENT DOCUMENTS

GB 678124 8/1952
JP 29-8626 12/1954
(Continued)

OTHER PUBLICATIONS

International Search Report issued Dec. 10, 2013 in corresponding International Application No. PCT/JP2013/075987.

*Primary Examiner* — Mary McManmon
*Assistant Examiner* — David Colon Morales
(74) *Attorney, Agent, or Firm* — Wenderoth, Lind & Ponack, L.L.P.

(57) ABSTRACT

A female coupling member includes a coupling member body having a fluid passage and being configured to receive a male coupling member from a front end thereof, and a valve member disposed in the coupling member body to traverse the fluid passage. The valve member has an opening and is displaceable between an open position and a closed position. In the open position, the valve member communicates between a front end side and a rear end side of the fluid passage through the opening. In the closed position, the opening is located outside the fluid passage to close communication between the front end side and the rear end side of the fluid passage. The valve member has a purge passage configured to communicate with both the front end side of the fluid passage and the atmosphere outside the female coupling member when the valve member is in the closed position.

8 Claims, 5 Drawing Sheets

(51) Int. Cl.
*F16K 3/02* (2006.01)
*F16L 37/23* (2006.01)

(58) Field of Classification Search
USPC .................................................. 251/149.9
See application file for complete search history.

(56) References Cited

U.S. PATENT DOCUMENTS

| | | | | |
|---|---|---|---|---|
| 3,437,106 A | * | 4/1969 | Leopold, Jr. | F16K 5/0636 137/382 |
| 3,618,892 A | * | 11/1971 | Sciuto, Jr. | F16L 29/007 251/149.2 |
| 3,684,241 A | * | 8/1972 | Hartmann | F16K 5/0605 137/625.22 |
| 4,306,705 A | * | 12/1981 | Svensson | A61B 5/20 251/148 |
| 4,340,203 A | | 7/1982 | Donner | |
| 4,347,870 A | * | 9/1982 | Maldavs | F16L 37/23 137/614.05 |
| 4,397,445 A | * | 8/1983 | Burquier | F16L 37/47 251/149.9 |
| 4,541,457 A | * | 9/1985 | Blenkush | F16L 37/0841 137/614.05 |
| 4,552,333 A | * | 11/1985 | Niemi | F16L 37/23 137/614.06 |
| 4,613,112 A | * | 9/1986 | Phlipot | F16L 37/22 137/71 |
| 4,716,934 A | * | 1/1988 | Levenez | F16K 11/074 137/589 |
| 5,002,254 A | * | 3/1991 | Belisaire | F16L 37/0841 251/149.8 |
| 5,038,817 A | * | 8/1991 | Henry | F16L 37/26 137/315.29 |
| 5,148,839 A | * | 9/1992 | Kirwan | F17C 5/06 137/614 |
| 5,240,023 A | * | 8/1993 | Shelef | F16L 37/22 137/15.09 |
| 5,413,309 A | * | 5/1995 | Giesler | F16K 24/02 137/614.06 |
| 5,423,515 A | | 6/1995 | Ozaki | |
| 5,535,985 A | * | 7/1996 | Larbuisson | F16L 37/086 251/149.1 |
| 5,547,166 A | * | 8/1996 | Engdahl | F16L 37/0848 251/149.6 |
| 5,806,832 A | * | 9/1998 | Larbuisson | F16L 37/42 251/149.6 |
| 6,089,539 A | * | 7/2000 | Kouda | F16L 37/23 251/149.2 |
| 6,116,278 A | * | 9/2000 | Baumgardner | F16K 3/0209 137/383 |
| 6,161,578 A | * | 12/2000 | Braun | F16L 37/0841 137/614.03 |
| 6,279,874 B1 | * | 8/2001 | Nyberg | F16L 37/121 137/614.03 |
| 6,378,555 B2 | * | 4/2002 | Kyle | F16L 37/46 137/613 |
| 6,412,828 B1 | | 7/2002 | Lacroix et al. | |
| 6,758,457 B2 | * | 7/2004 | Nicolino | F16L 37/084 137/614.05 |
| 6,840,548 B2 | * | 1/2005 | Lacroix | F16L 37/0841 251/149.6 |
| 6,893,002 B2 | * | 5/2005 | Brice | F16K 3/0209 137/383 |
| 7,472,930 B2 | * | 1/2009 | Tiberghien | F16L 37/0841 285/308 |
| 7,537,246 B2 | * | 5/2009 | Mikiya | F16L 37/35 251/149.6 |
| 7,549,445 B2 | * | 6/2009 | Mikiya | F16L 37/373 137/625.22 |
| 7,584,782 B1 | * | 9/2009 | Bizzarro | B64D 37/32 137/861 |
| 7,887,102 B2 | * | 2/2011 | Tiberghien | F16L 37/0841 285/1 |
| 2004/0094956 A1 | * | 5/2004 | Lacroix | F16L 37/0841 285/306 |
| 2006/0118184 A1 | | 6/2006 | Mikiya et al. | |
| 2007/0209718 A1 | * | 9/2007 | Hansen | F16L 37/23 137/614 |
| 2010/0127198 A1 | * | 5/2010 | Cozza | F16L 37/23 251/149.1 |

FOREIGN PATENT DOCUMENTS

| | | |
|---|---|---|
| JP | 48-10728 | 4/1973 |
| JP | 1-65985 | 4/1989 |
| JP | 1-174692 | 12/1989 |
| JP | 2732017 | 3/1998 |
| JP | 2000-120964 | 4/2000 |
| JP | 2000-170978 | 6/2000 |
| JP | 2004-84934 | 3/2004 |
| JP | 2011-106634 | 6/2011 |
| JP | 2012-102846 | 5/2012 |
| WO | 2011/052069 | 5/2011 |

* cited by examiner

FEMALE JOINT HAVING SAFETY FUNCTION

BACKGROUND OF THE INVENTION

1. Technical Field

The present invention relates to a female coupling member to which a male coupling member can be detachably coupled. More specifically, the present invention relates to a female coupling member having a safety function.

2. Description of Related Art

A female coupling member connected to a pressurized fluid source usually has a valve member for opening and closing a fluid passage passing a fluid from the pressurized fluid source. In an uncoupled state where a male coupling member is not inserted in the female coupling member, the valve member is urged by a spring toward a front end of the female coupling member and thus is placed in a position for closing the fluid passage. When a male coupling member is inserted into the female coupling member so as to be coupled thereto, the valve member is pushed by the male coupling member toward a rear end of the female coupling member against the urging force of the spring to open the fluid passage (Japanese Patent No. 2732017).

TECHNICAL PROBLEM

The above-described female coupling member, however, has the following problem. When the male coupling member is moved so as to be decoupled from the female coupling member and thus the valve member is brought into the closed position, a high fluid pressure may remain in a part of the fluid passage in the female coupling member that is closer to the front end than the valve member, which may cause the male coupling member to be blown off.

SUMMARY OF INVENTION

The present invention has been made in view of the above-described problem, and it is an object of the present invention to provide a female coupling member having a safety function for preventing a male coupling member from being accidentally blown off by the pressure in the female coupling member when the male coupling member is decoupled from the female coupling member.

SOLUTION TO PROBLEM

The present invention provides a female coupling member having a safety function, to which a male coupling member can be detachably coupled. The female coupling member includes a coupling member body having a front end, a rear end, and a fluid passage extending through the coupling member body from the front end to the rear end in a direction of a longitudinal axis. The coupling member body is configured to receive a male coupling member from the front end. The female coupling member further includes a valve member disposed in the coupling member body to traverse the fluid passage. The valve member has an opening extending therethrough in the direction of the longitudinal axis. The valve member is displaceable between an open position and a closed position in a direction traversing the longitudinal axis of the coupling member body. In the open position, the valve member communicates between the front end side of the fluid passage and the rear end side of the fluid passage through the opening. In the closed position, the opening is located outside the fluid passage so as to close communication between the front end side of the fluid passage and the rear end side of the fluid passage. The valve member has a purge passage configured to communicate with both the fluid passage and the atmosphere outside the female coupling member when the valve member is in the closed position.

In the female coupling member, when the valve member is in the closed position, a fluid pressure left between the male coupling member and the front end side of the fluid passage in the female coupling member can be relieved to the atmosphere. Accordingly, it is possible to prevent the male coupling member from being blown off by the fluid pressure.

Specifically, the valve member may be a plate-shaped member having a front surface facing the front end side of the fluid passage and a rear surface facing the rear end side of the fluid passage and being displaceable between the open position and the closed position by moving parallel to a plane parallel to the front surface and the rear surface.

Thus, the opening/closing movement of the valve member is less affected by the pressure in the fluid passage in comparison to a valve member configured to be displaceable in the longitudinal direction of the fluid passage. Accordingly, it is possible to displace the valve with a relatively small force. In addition, because the valve member is a plate-shaped member, the overall length of the female coupling member can be reduced, and it is possible to simplify the structures of seals between the valve member and the coupling member body, and so forth.

More specifically, the opening of the valve member may be a crescent-shaped opening comprising an arcuate surface aligning with the circumferential surface of the fluid passage when the valve member is in the open position and a surface connecting between the opposite ends of the arcuate surface.

With the above-described structure, it is possible to reduce the distance of movement of the valve member between the open position and the closed position.

More specifically, the valve member may be displaceable in a direction intersecting the longitudinal axis substantially at a right angle.

With the above-described structure, it is possible to minimize the effect of drag due to the internal pressure on the valve member during an opening/closing operation.

Preferably, the arrangement may be as follows. The coupling member body has an outer peripheral surface and an inner peripheral surface extending in the longitudinal direction, and a locking member retaining hole extending through the coupling member body from the outer peripheral surface to the inner peripheral surface. The female coupling member further has a locking member disposed in the locking member retaining hole, a support ring disposed over the inner peripheral surface of the coupling member body slidably in the direction of the longitudinal axis, and a sleeve disposed over the outer peripheral surface of the coupling member body slidably in the direction of the longitudinal axis. In an uncoupled state where the associated male coupling member is not coupled to the female coupling member, the support ring is located radially inward of the locking member retaining hole to support the locking member in a position where the locking member projects radially outward from the outer peripheral surface of the coupling member body, and the sleeve is engaged with the locking member projecting radially outward so that the sleeve cannot move toward the front end, and further the valve member is engaged with the sleeve so that the valve member cannot move to the open position. As the male coupling member is inserted from the front end of the coupling member body, the support ring is pushed by the male coupling member to slide toward the rear end of the coupling member body, so that the locking member is released from support to become movable radially inward. Upon completion of the insertion of the male coupling member into the female coupling member, the locking member engages a locking member engagement groove formed on the male coupling member, and the sleeve is disengaged from the locking member and moves toward the front end to block radially outward displacement of the locking member and to allow displacement of the valve member from the closed position to the open position.

In an uncoupled state where the male coupling member is not inserted in the female coupling member, the valve member cannot move to the open position. Therefore, there is no danger of the valve member accidentally opening in the uncoupled state, and hence it is possible to improve safety.

More preferably, the arrangement may be as follows. When the valve member is in the open position, the sleeve is engaged with the valve member so that the sleeve cannot slide toward the rear end of the coupling member body.

When the valve member is in the open position, the sleeve cannot slide toward the rear end, and therefore, the male coupling member cannot be decoupled. Accordingly, there is no danger of the male coupling member being accidentally decoupled when the valve member is in the open position, and thus safety can be improved further.

More preferably, the arrangement may be as follows. The female coupling member further has a safety member slidably disposed over the outer peripheral surface of the coupling member body between the sleeve and the valve member. When the female coupling member is in the uncoupled state, the safety member is held between the sleeve and the valve member so that the safety member cannot slide toward the front end of the coupling member body, and in this state, the safety member engages the valve member to lock the valve member from moving to the open position. As the male coupling member is inserted, the sleeve slides toward the front end, thereby allowing the safety member to slide toward the front end. As the safety member moves toward the front end of the coupling member body, the safety member disengages from the valve member, thereby allowing the valve member to move from the closed position to the open position.

More preferably, the arrangement may be as follows. The female coupling member further has a spring member urging the sleeve and the safety member away from each other. When the valve member reaches the open position, the safety member, which is urged toward the valve member by the spring member, engages the valve member to lock the valve member from moving to the closed position. When the safety member is moved toward the front end of the coupling member body against urging force of the spring member, the safety member is disengaged from the valve member, thereby allowing the valve member to move to the closed position.

Since there is no possibility of the valve member being accidentally displaced between the open position and the closed position, safety can be improved even further.

DESCRIPTION OF EMBODIMENTS

Figure 1:
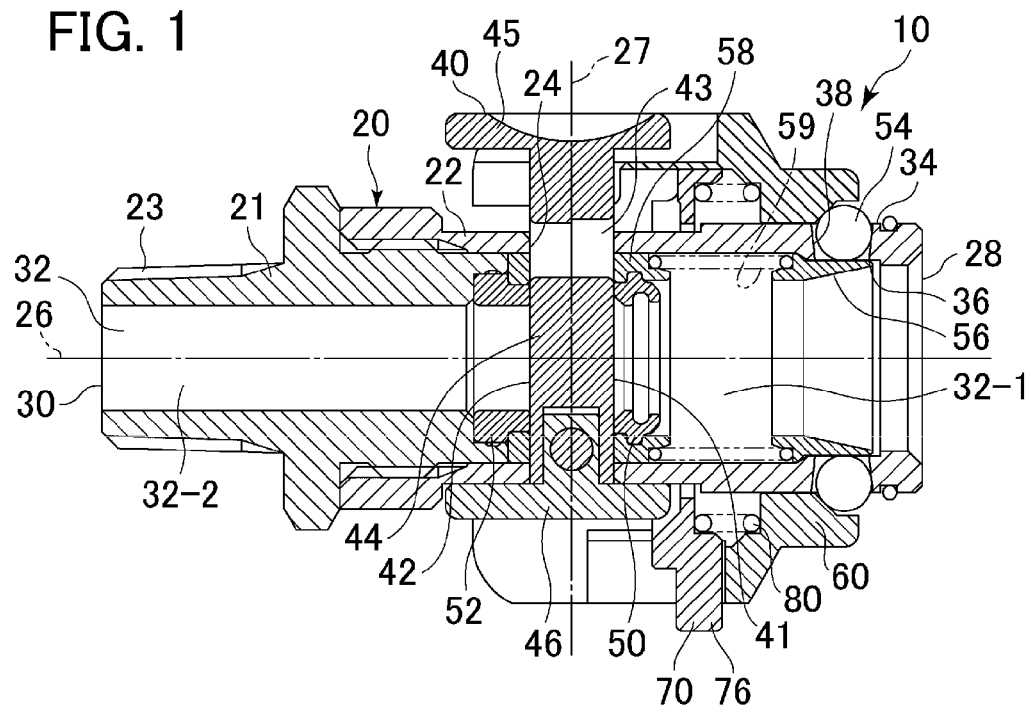
FIG. 1 is a longitudinal sectional view of a female coupling member according to the present invention.
Figure 2:
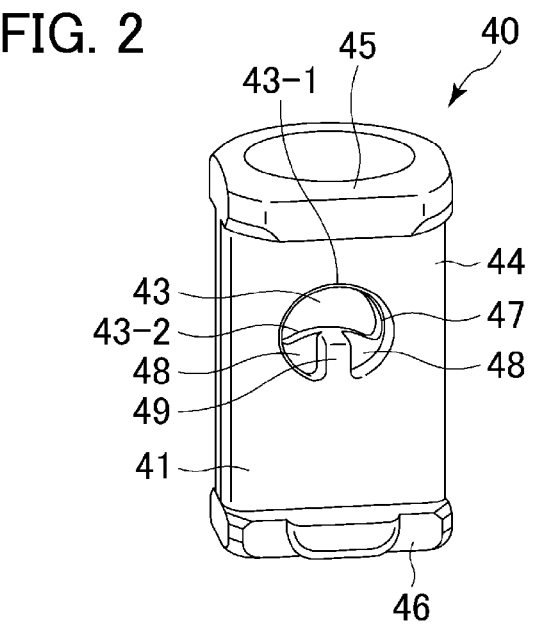
FIG. 2 is a perspective view of a valve member.

As shown in FIG. 1, a female coupling member 10 according to the present invention has a coupling member body 20 and a valve member 40. The coupling member body 20 comprises a connecting part 21 having, at a rear end thereof, an externally threaded portion 23 to be connected to a fluid supply source, and a tubular part 22 thread-engaged with a front end portion of the connecting part 21. The valve member 40 is inserted in a through-hole 24 formed in the coupling member body 20 to vertically traverse a fluid passage 32 extending through the coupling member body 20 from a front end 28 thereof to a rear end 30 thereof in the direction of a longitudinal axis 26. The valve member 40 is displaceable in a vertical direction as seen in FIG. 1 (i.e., in the direction of a transverse axis 27 perpendicularly intersecting the longitudinal axis 26). As shown in FIG. 2, the valve member 40 comprises a plate-shaped valve body part 44 having a front surface 41 and a rear surface 42. The valve member 40 further comprises an upper pressing portion 45 located at the top of the valve body part 44 and a lower pressing portion 46 secured to the bottom of the valve body part 44.

Figure 3:
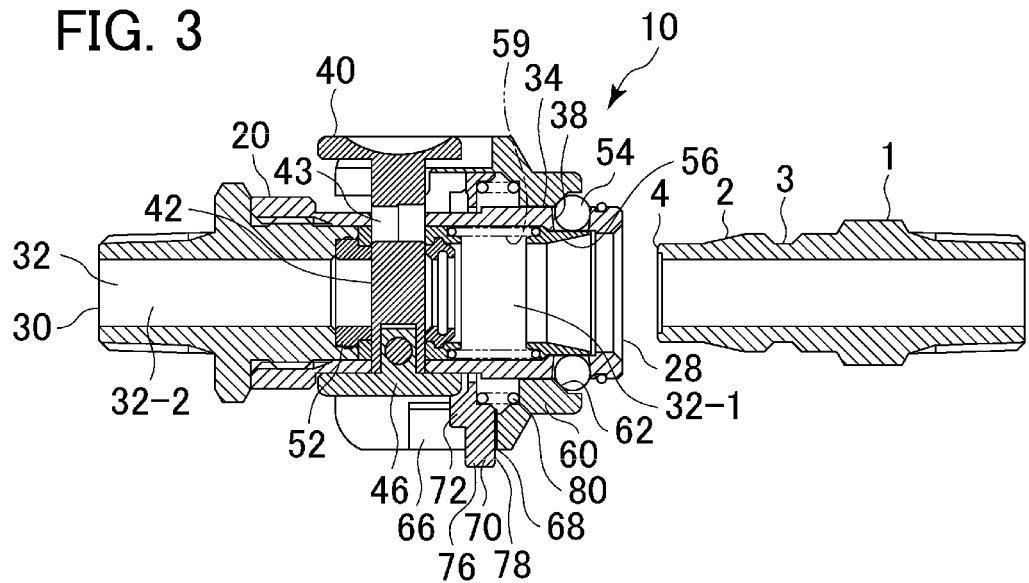
FIG. 3 is a longitudinal sectional view showing the female coupling member and a male coupling member in an uncoupled state.
Figure 6:
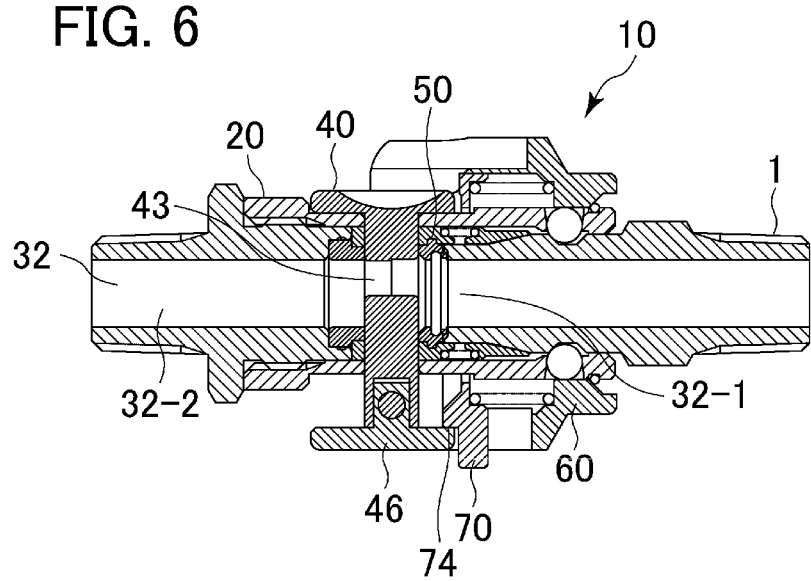
FIG. 6 is a longitudinal sectional view showing the female coupling member and the male coupling member in an open state.

The coupling member body 20 has an inner peripheral surface 36 extending in the direction of the longitudinal axis 26. The inner peripheral surface 36 is provided with a front seal ring 50 and a rear seal ring 52, which are disposed to surround the fluid passage 32. The front seal ring 50 sealingly engages the front surface 41 of the valve member 40, and the rear seal ring 52 sealingly engages the rear surface 42 of the valve member 40. The valve member 40 is provided with an opening 43 extending through the valve body part 44 in the direction of the longitudinal axis 26. As will be explained below, when the valve member 40 is in a closed position, the opening 43 is located outside the fluid passage 32 so as to close communication between a front end side 32-1 of the fluid passage 32 and the rear end side 32-2 of the fluid passage 32 (FIG. 3). When the valve member 40 is in an open position, the front end side 32-1 of the fluid passage 32 and the rear end side 32-2 of the fluid passage 32 are communicated with each other through the opening 43 (FIG. 6).

The coupling member body 20 has a locking member retaining hole 38 formed therein to radially extend therethrough from an outer peripheral surface 34 to an inner peripheral surface 36 of the coupling member body 20, and a locking member 54 is disposed in the locking member retaining hole 38. The inner peripheral surface 36 is provided with a support ring 56 slidably disposed in the direction of the longitudinal axis 26. A spring member 59 is disposed between the support ring 56 and a front seal ring retaining member 58 retaining the front seal ring 50. The spring member 59 urges the support ring 56 forward and presses the front seal ring 50 against the front surface 41 of the valve member 40 to sealing engage the front surface 41. The female coupling member 10 further has a sleeve 60 slidably disposed over the outer peripheral surface 34 in the direction of the longitudinal axis 26, and a ring-shaped safety member 70 slidably disposed over the outer peripheral surface 34 between the sleeve 60 and the valve member 40. Further, the female coupling member 10 has a spring member 80 urging the sleeve 60 and the safety member 70 away from each other.

As shown in FIG. 2, the valve member 40 has a generally circular opening portion 47 formed in the valve body part 44 so as to correspond to the front seal ring 50 and the rear seal ring 52, which are provided on the inner peripheral surface 36 of the coupling member body 20. The opening 43 extends through the valve body part 44 in the upper half of the opening portion 47. The opening 43 is a crescent-shaped opening comprising an arcuate upper-edge surface 43-1 and an arcuate lower-edge surface 43-2. The arcuate upper-edge surface 43-1 aligns with the upper half of the circumferential surface of the fluid passage 32 at each of the front side of the valve member 40 and the rear side of the valve member 40 when the valve member 40 is in the open position. The arcuate lower-edge surface 43-2 substantially aligns with the upper half of the circumferential surface of the fluid passage 32 at each of the front side of the valve member 40 and the rear side of the valve member 40 when the valve member 40 is in the closed position. The crescent-shaped opening 43 makes it possible to ensure an opening area sufficient to provide communication between the front end side 32-1 of the fluid passage 32 and the rear end side 32-2 of the fluid passage 32 while reducing the amount of vertical movement of the valve member 40 required to open and close the valve member 40. In the lower half of the opening portion 47, purge grooves 48 are formed in the front surface 41 of the valve body part 44 at both sides of a seal ring retaining portion 49 extending along the center of the opening portion 47. The purge grooves 48 constitute a purge passage.

Figure 7:
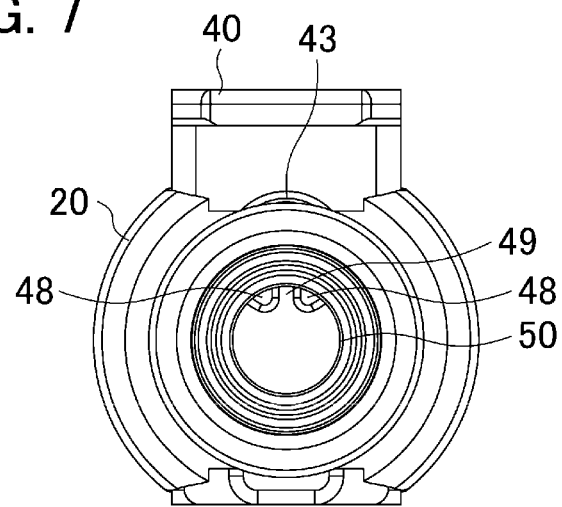
FIG. 7 is a front end view showing a coupling member body, the valve member, and a front seal ring in a closed state.
Figure 8:
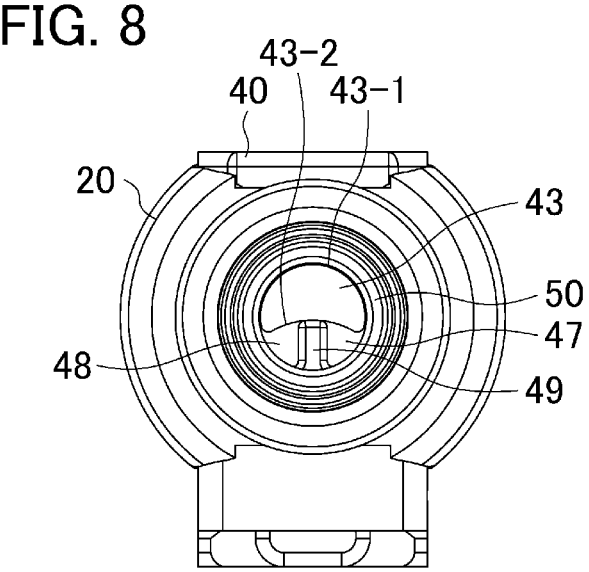
FIG. 8 is a front end view showing the coupling member body, the valve member, and the front seal ring in an open state.

When the valve member 40 is, as shown in FIG. 3, in a closed position reached by the valve member 40 when displaced upward as seen in FIG. 3, the opening 43 is located outside the fluid passage 32, and the rear surface 42 sealingly engages the rear seal ring 52 so as to close communication between the front end side 32-1 of the fluid passage 32 and the rear end side 32-2 of the fluid passage 32. At this time, as will be understood from FIG. 7, which shows the coupling member body 20, the valve member 40 and the front seal ring 50 as seen from the front end 28, a part of each purge groove 48 is located within the fluid passage 32, and a part of the opening 43 is, as shown in FIGS. 1 and 7, located outside the coupling member body 20. Thus, the front end side 32-1 of the fluid passage 32 is open to the atmosphere through the purge passage comprising the purge grooves 48. That is, when the valve member 40 is in the closed position, the pressure in the rear end side 32-2 of the fluid passage 32 is maintained, while the pressure in the front end side 32-1 of the fluid passage 32 is released to the atmosphere. With this structure, when the male coupling member 1 is decoupled from the female coupling member 10, the male coupling member 1 is cut off from the pressure on the side of the fluid source connected to the female coupling member 10, and the pressure in the male coupling member 1 is relieved to the outside, thereby allowing the male coupling member 1 to be pulled out safely. In addition, the seal ring retaining portion 49 serves to retain a part of the front seal ring 50. That is, the seal ring retaining portion 49 prevents the front seal ring 50 from becoming dislodged by a gushing flow of fluid from the front end side 32-1 of the fluid passage 32 that is discharged through the purge grooves 48 when the valve member 40 reaches the closed position. It should be noted that when the female coupling member 10 is in an open state (FIG. 6) that is reached when the valve member 40 is displaced downward to the open position, as will be understood from FIG. 8, the front seal ring 50 sealingly engages the front surface 41 of the valve member 40 without a gap around the circumference of the opening portion 47; therefore, the front end side 32-1 of the fluid passage 32 is sealed and not opened to the atmosphere.

In an uncoupled state, shown in FIG. 3, where the male coupling member 1 is not inserted so as to be coupled to the female coupling member 10, the support ring 56 is located radially inward of the locking member retaining hole 38 to engage the locking member 54, causing a part of the locking member 54 to project radially outward from the outer peripheral surface 34 of the coupling member body 20. The sleeve 60 is retracted by engagement with the locking member 54 projecting from the outer peripheral surface 34 of the coupling member body 20. More specifically, the locking member 54 engages a locking member engagement surface 62 formed at the front end of the sleeve 60, causing the sleeve 60 to be retracted and held in the retracted position. Thus, the sleeve 60 is locked from moving forward. At this time, the sleeve 60 extends to a position adjacent to the front surface of the valve member 40, and the safety member 70 is located in the sleeve 60 as a whole except an operating portion 76 extending radially outward. The sleeve 60 has an opening portion 66 in a lower part thereof. From the opening portion 66, the operating portion 76 of the safety member 70 projects radially outward. In the sleeve 60, a spring member 80 is disposed between the sleeve 60 and the safety member 70. The spring member 80 urges the safety member 70 and the sleeve 60 away from each other. That is, the safety member 70 is urged rearward, and the sleeve 60 is urged forward. The safety member 70 is positioned such that an inclined engagement surface 72 thereof engages the lower pressing portion 46 of the valve member 40. In addition, a front surface 78 of the operating portion 76 is located close to a safety member engagement surface 68 of the opening portion 66 of the sleeve 60 as held in the retracted position. Thus, the safety member 70 is in the state of being unable to move forward. Accordingly, in a state where the male coupling member 1 is not inserted in the female coupling member 10, even if an attempt is made to displace the valve member 40 downward (as seen in FIG. 3) to the open position, the sleeve 60 interferes with the valve member 40 to block the displacement (i.e., the sleeve 60 blocks the forward movement of the safety member 70 and hence blocks the valve member 40 engaged with the safety member 70 from being displaced downward toward the open position). Therefore, in a state where the male coupling member 1 is not inserted in the female coupling member 10, the valve member 40 cannot be displaced from the closed position to the open position, and thus the valve member 40 is prevented from being accidentally opened.

Figure 4:
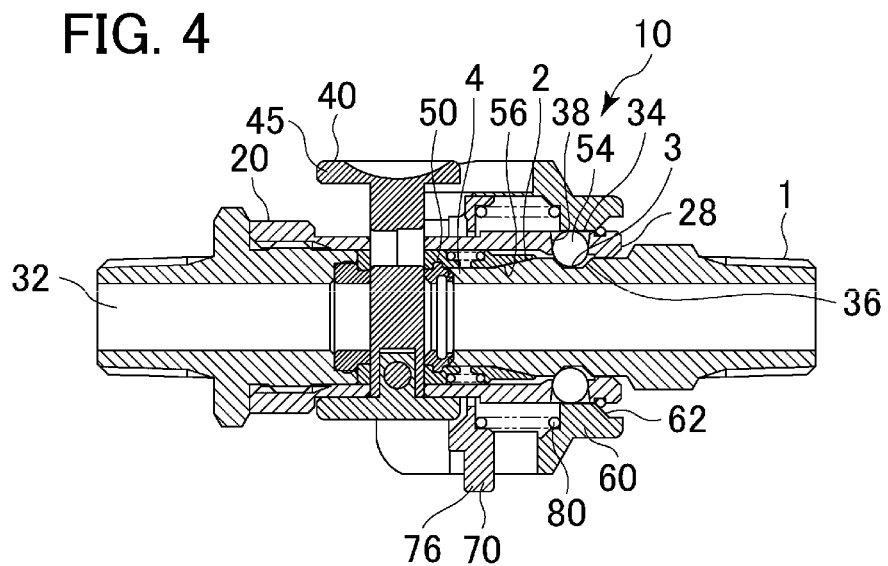
FIG. 4 is a longitudinal sectional view showing the female coupling member and the male coupling member in a state where the male coupling member has been inserted into the female coupling member.

As shown in FIG. 4, as the male coupling member 1 is inserted into the female coupling member 10 from the front end 28 of the female coupling member 10, the support ring 56 engages an outer peripheral surface 2 of the male coupling member 1 and is pushed rearward. Consequently, the locking member 54 is released from support by the support ring 56 to become movable radially inward, and when a locking member engagement groove 3 of the male coupling member 1 comes to a position inward of the locking member retaining hole 38, the locking member 54 moves inward by being pressed by the locking member engagement surface 62 of the sleeve 60 and engages the locking member engagement groove 3. Accordingly, the locking member 54 is placed in a position where the locking member 54 does not project from the outer peripheral surface 34, and thus is disengaged from the sleeve 60, thereby allowing the sleeve 60 to be moved forward by urging force of the spring member 80. The sleeve 60 advances to a position where the sleeve 60 closes the locking member retaining hole 38 at the radial outside of the locking member retaining hole 38, and holds the locking member 54 in the locking member retaining hole 38 from the outside, thereby maintaining engagement between the locking member 54 and the locking member engagement groove 3 of the male coupling member 1 to prevent the male coupling member 1 from being decoupled from the female coupling member 10. In this way, the female coupling member 10 reaches a state shown in FIG. 4, in which the male coupling member 1 is inserted therein. At this time, a front end surface 4 of the male coupling member is sealingly engaged with the front seal ring 50.

Figure 5:
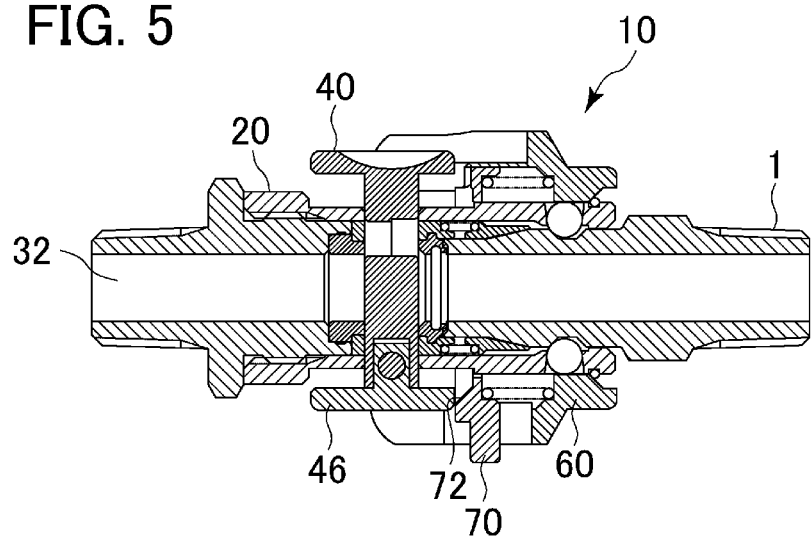
FIG. 5 is a longitudinal sectional view showing the female coupling member and the male coupling member in a state where the valve member is being displaced to an open position.

When the female coupling member 10 is in the state shown in FIG. 4, the sleeve 60 is in the advanced position. Therefore, a space is formed between the safety member 70 and the safety member engagement surface 68 of the opening portion 66 of the sleeve 60, and the safety member 70 can be moved forward against the urging force of the spring member 80 by pushing the operating portion 76 forward. Accordingly, the valve member 40 is free from the interference of the safety member 70; therefore, when the upper pressing portion 45 of the valve member 40 is pressed downward, the valve member 40 is displaced toward the open position, and, as shown in FIG. 5, the lower pressing portion 46 engages the inclined engagement surface 72 of the safety member 70, causing the safety member 70 to be pushed away forward. Consequently, the valve member 40 moves to the open position shown in FIG. 6. Then, the front end side 32-1 of the fluid passage 32 and the rear end side 32-2 of the fluid passage 32 are communicated with each other through the opening 43, and the female coupling member 10 reaches an open state. At this time, a horizontal engagement surface 74 of the safety member 70 engages the lower pressing portion 46 of the valve member 40 to lock the valve member 40 from moving upward toward the closed position. It is necessary, in order to move the valve member 40 to the closed position, to operate the operating portion 76 to move the safety member 70 forward to disengage from the valve member 40 and, in this state, to press the lower pressing portion 46 upward to move the valve member 40. Therefore, the danger of the valve member 40 being accidentally moved to the closed position is reduced to a considerable extent.

Figure 9:
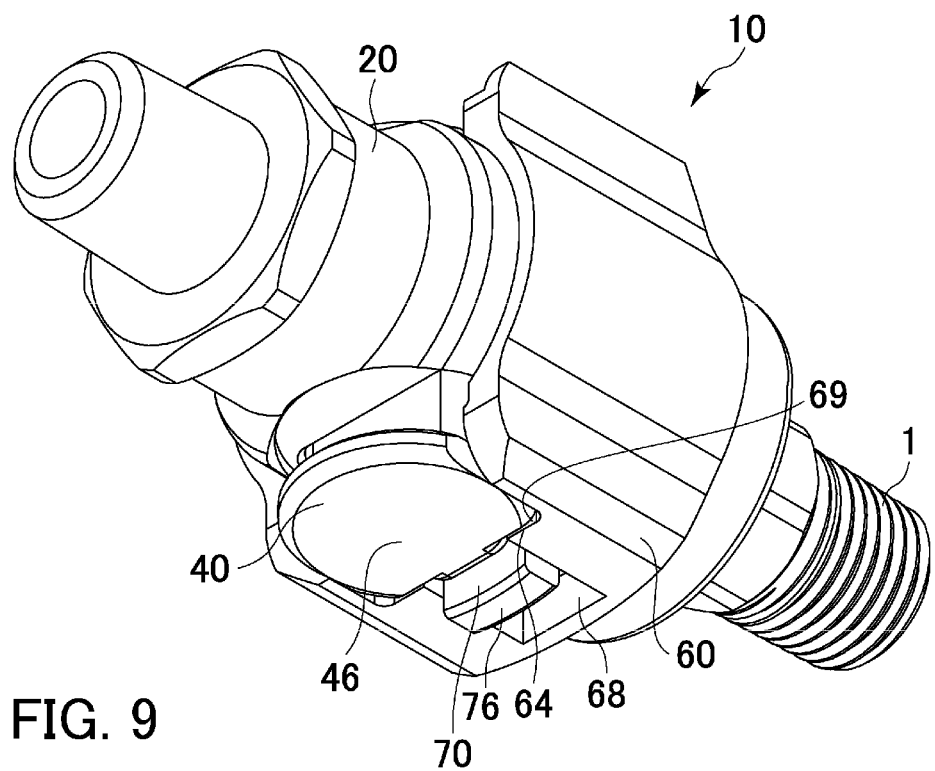
FIG. 9 is a perspective view showing the female coupling member and the male coupling member in an open state.

When the valve member 40 is in the open position, as shown in FIG. 9, if an attempt is made to retract the sleeve 60, a valve engagement surface 69 of the sleeve 60 abuts against the lower pressing portion 46 of the valve member 40; therefore, the sleeve 60 cannot be retracted. That is, when the valve member 40 is in the open position, the locking member 54 and the locking member engagement groove 3 cannot be disengaged from each other; therefore, the male coupling member 1 cannot be decoupled from the female coupling member 10. With this structure, there is no danger of the male coupling member 1 being accidentally decoupled from the female coupling member 10.

In the female coupling member 10 of the present invention, the direction of displacement of the valve member 40 is a direction traversing the longitudinal axis 26 of the fluid passage 32, preferably a direction traversing the longitudinal axis 26 at a right angle. Therefore, the opening/closing movement of the valve member 40 is less affected by the pressure in the fluid passage 32. Accordingly, it is possible to displace the valve member 40 with a relatively small force. In addition, the female coupling member 10 is configured such that coupling and decoupling of the male coupling member 1 and the operation of opening and closing the valve member 40 can be performed only under appropriate conditions, and that there is no possibility that the male coupling member 1 may be accidentally decoupled from the female coupling member 10 or that the valve member 40 may be accidentally opened. Accordingly, it is also possible to ensure high safety.

It should be noted that, although in this embodiment the purge grooves 48 constitute a purge passage, another structure may be used. For example, a purge passage may comprise a hole formed in the valve member 40 so as to extend from the front surface 41 to the inner peripheral surface of the opening 43.

LIST OF REFERENCE SIGNS

1: male coupling member
2: outer peripheral surface
3: locking member engagement groove
4: front end surface
10: female coupling member
20: coupling member body
21: connecting part
22: tubular part
23: externally threaded portion
24: through-hole
26: longitudinal axis
27: transverse axis
28: front end
30: rear end
32: fluid passage
32-1: front end side
32-2: rear end side
34: outer peripheral surface
36: inner peripheral surface
38: locking member retaining hole
40: valve member
41: front surface
42: rear surface
43: opening
43-1: upper edge
43-2: lower edge
44: valve body part
45: upper pressing portion
46: lower pressing portion
47: opening portion
48: purge groove
49: seal ring retaining portion
50: front seal ring
52: rear seal ring
54: locking member
56: support ring
58: front seal ring retaining member
59: spring member 60: sleeve
62: locking member engagement surface
66: opening portion
68: safety member engagement surface
69: valve engagement surface
70: safety member
72: inclined engagement surface
74: horizontal engagement surface
76: operating portion
78: front surface
80: spring member

The invention claimed is:

1. A female coupling member having a safety function, to which a male coupling member can be detachably coupled, the female coupling member comprising:
   a coupling member body having a front end, a rear end, and a fluid passage extending through the coupling member body from the front end to the rear end in a direction of a longitudinal axis of the coupling member body, the coupling member body being configured to receive the male coupling member from the front end of the coupling member body; and
   a valve member disposed in the coupling member body so as to traverse the fluid passage, the valve member having an opening extending therethrough in the direction of the longitudinal axis of the coupling member body, the valve member being displaceable between an open position and a closed position in a direction traversing the longitudinal axis of the coupling member body, wherein, in the open position, the valve member provides communication between a front end side of the fluid passage and a rear end side of the fluid passage through the opening, whereas, in the closed position, the opening is located outside the fluid passage so as to close communication between the front end side of the fluid passage and the rear end side of the fluid passage;
   wherein the valve member has a purge passage configured to communicate with both the front end side of the fluid passage and an atmosphere outside the female coupling member when the valve member is in the closed position;
   wherein the valve member is a plate-shaped member having a front surface facing the front end side of the fluid passage and a rear surface facing the rear end side of the fluid passage, the valve member being displaceable between the open position and the closed position by moving parallel to a plane parallel to the front surface and the rear surface; and
   wherein the fluid passage has a circular cross section and the opening of the valve member is a crescent-shaped opening comprising an arcuate surface aligning with a circumferential surface of the fluid passage when the valve member is in the open position and a surface extending between opposite ends of the arcuate surface in a direction traversing a path along which the valve member is displaced between the open position and the closed position, the surface extending between the opposite ends of the arcuate surface being positioned closer to the fluid passage than the arcuate surface when the valve member is at the closed position such that, when the valve is displaced from the closed position toward the open position, the surface extending between the opposite ends of the arcuate surface first enters the fluid passage.

2. The female coupling member having a safety function of claim 1, wherein the valve member is displaceable in a direction intersecting the longitudinal axis substantially at right angles.

3. The female coupling member having a safety function of claim 1, wherein the coupling member body has an outer peripheral surface and inner peripheral surface extending in the direction of the longitudinal axis of the coupling member body, and a locking member retaining hole extending through the coupling member body from the outer peripheral surface to the inner peripheral surface;
   the female coupling member further comprising:
   a locking member disposed in the locking member retaining hole;
   a support ring disposed over the inner peripheral surface of the coupling member body slidably in the direction of the longitudinal axis of the coupling member body; and
   a sleeve disposed over the outer peripheral surface of the coupling member body slidably in the direction of the longitudinal axis of the coupling member body;
   wherein, in an uncoupled state where the male coupling member is not coupled to the female coupling member, the support ring is located radially inward of the locking member retaining hole to support the locking member in a position where the locking member projects radially outward from the outer peripheral surface of the coupling member body, and the sleeve is engaged with the locking member projecting radially outward so that the sleeve cannot move toward the front end of the coupling member body, and further the valve member is engaged with the sleeve so that the valve member cannot move to the open position; and
   wherein as the male coupling member is inserted from the front end of the coupling member body, the support ring is pushed by the male coupling member to slide toward the rear end of the coupling member body, so that the locking member is released from support to become movable radially inward, and upon completion of insertion of the male coupling member into the female coupling member, the locking member engages a locking member engagement groove formed on the male coupling member, and the sleeve is disengaged from the locking member and moves toward the front end of the coupling member body to block radially outward displacement of the locking member and to allow displacement of the valve member from the closed position to the open position.

4. The female coupling member having a safety function of claim 3, wherein when the valve member is in the open position, the sleeve is engaged with the valve member so that the sleeve cannot slide toward the rear end of the coupling member body.

5. The female coupling member having a safety function of claim 3, further comprising:
   a safety member slidably disposed over the outer peripheral surface of the coupling member body between the sleeve and the valve member;
   wherein when the female coupling member is in the uncoupled state, the safety member is held between the sleeve and the valve member so that the safety member cannot slide toward the front end of the coupling member body, and in the uncoupled state, the safety member engages the valve member to lock the valve member from moving to the open position, and as the male coupling member is inserted, the sleeve slides toward the front end of the coupling member body, thereby allowing the safety member to slide toward the front end of the coupling member body, and wherein as the safety member moves toward the front end of the coupling member body, the sleeve disengages from the valve member, thereby allowing the valve member to move from the closed position to the open position.

6. The female coupling member having a safety function of claim 5, further comprising:

a spring member urging the sleeve and the safety member away from each other;

wherein when the valve member reaches the open position, the safety member, which is urged toward the valve member by the spring member, engages the valve member to lock the valve member from moving to the closed position; and wherein when the safety member is moved toward the front end of the coupling member body against urging force of the spring member, the safety member is disengaged from the valve member, thereby allowing the valve member to move to the closed position.

7. The female coupling member having a safety function of claim 1, wherein:

the front surface of the plate-shaped member includes at least one purge groove extending from the opening in a direction from the closed position to the open position; and, the opening and the at least one purge groove are configured such that, in the closed position, the opening is partly positioned outside of the coupling member body and the at least one purge groove is partly positioned in the fluid passage to form the purge passage.

8. The female coupling member having a safety function of claim 7, wherein:

the front end side of the fluid passage is provided with a front seal ring surrounding the fluid passage and being adapted to sealingly engage the front surface of the plate-shaped member when the valve member is in the closed position;

the at least one purge groove includes a pair of purge grooves and, the front surface of the plate-shaped member includes the pair of purge grooves, the purge grooves being spaced apart from each other to form a seal ring retaining portion therebetween; the seal ring retaining portion being configured to engage the front seal ring when the valve member is in the closed position to prevent the front seal ring from being dislodged from the front end side of the fluid passage.

* * * * *